United States Patent

Omi et al.

Patent Number: 5,988,956
Date of Patent: Nov. 23, 1999

[54] HOLE CUTTER

[75] Inventors: Shohei Omi; Yasuo Imai, both of Anjo, Japan

[73] Assignee: Omi Kogyo Co., Ltd., Aichi-ken, Japan

[21] Appl. No.: 08/743,978

[22] Filed: Nov. 6, 1996

[30] Foreign Application Priority Data

Jan. 29, 1996 [JP] Japan .................................. 8-013335

[51] Int. Cl.⁶ .................................................. B23B 51/04
[52] U.S. Cl. .......................... 408/204; 408/223; 408/703
[58] Field of Search ................................... 408/204, 206, 408/703

[56] References Cited

U.S. PATENT DOCUMENTS

| | | | |
|---|---|---|---|
| 3,765,789 | 10/1973 | Hougen | 408/204 |
| 3,860,354 | 1/1975 | Hougen | 408/206 |
| 4,408,935 | 10/1983 | Miyanaga | 408/206 |
| 4,516,890 | 5/1985 | Beharry | 408/204 |
| 4,586,857 | 5/1986 | Ohmi | 408/204 |
| 4,632,610 | 12/1986 | Hougen | 408/204 |
| 4,767,245 | 8/1988 | Shoji et al. | 408/204 |

FOREIGN PATENT DOCUMENTS

| | | | |
|---|---|---|---|
| 1 997 581 | 11/1968 | Germany . | |
| 57-211407 | 12/1982 | Japan | 408/204 |

*Primary Examiner*—Steven C. Bishop
*Attorney, Agent, or Firm*—Sheridan Ross P.C.

[57] ABSTRACT

A hole cutter having a body provided with first and second types of cutting teeth. The cutter facilitates the discharge of cutting chips during machining of a workpiece. The tooth depth of the left and right sections of each of the second type of teeth is smaller than that of the left and right sections of each of the first type of teeth. The tooth depth of the middle section of each tooth of the second type is greater than that of the middle section of each tooth of the first type. A linear flattening section is provided at the middle portion of a second blade edge of each tooth of the second type. The flattening section causes each cutting chip to be shaped in a strip-like manner when removed from the workpiece. This separates the ends of the cutting chips from each other and prevents the chips from becoming entangled to one another.

12 Claims, 6 Drawing Sheets

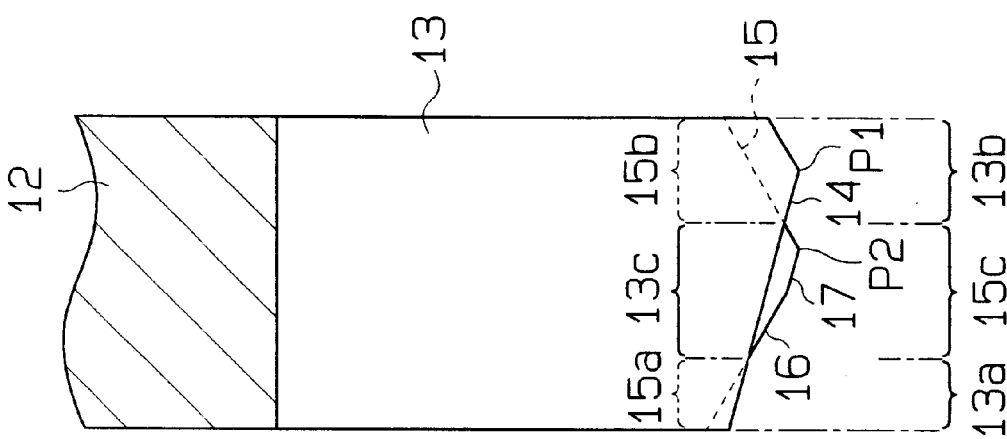
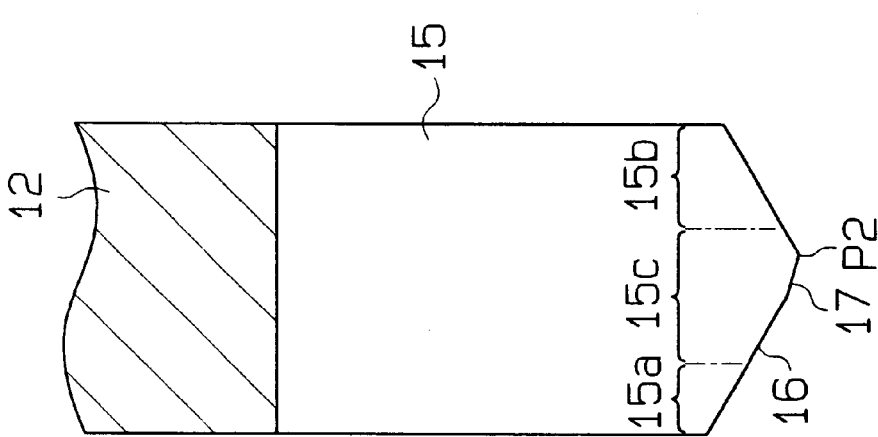
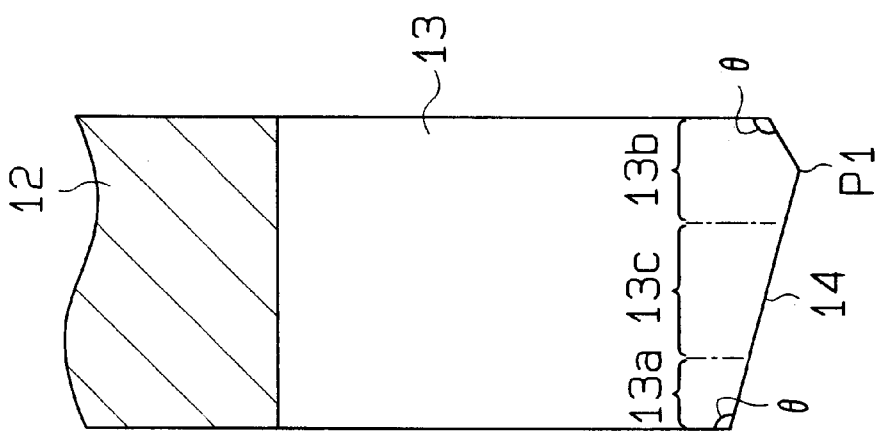

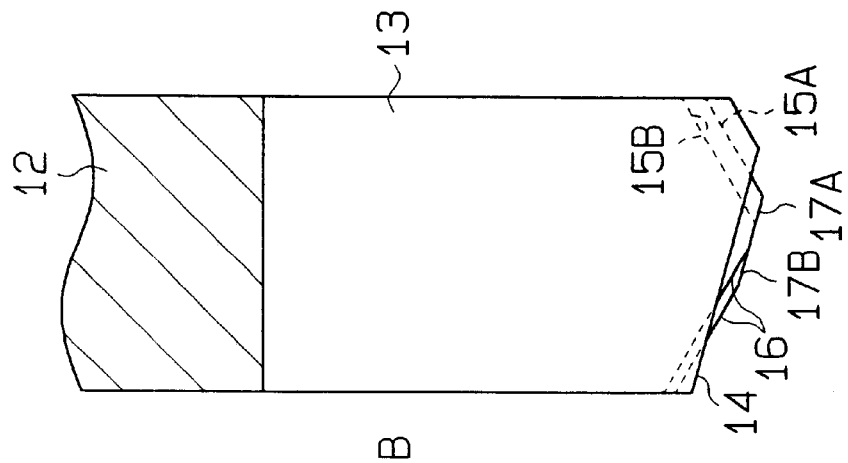
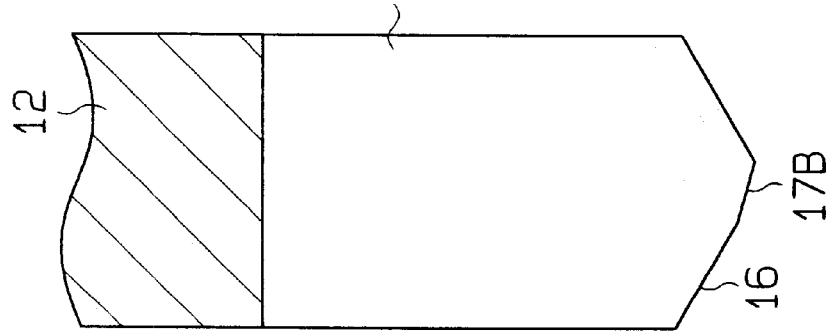
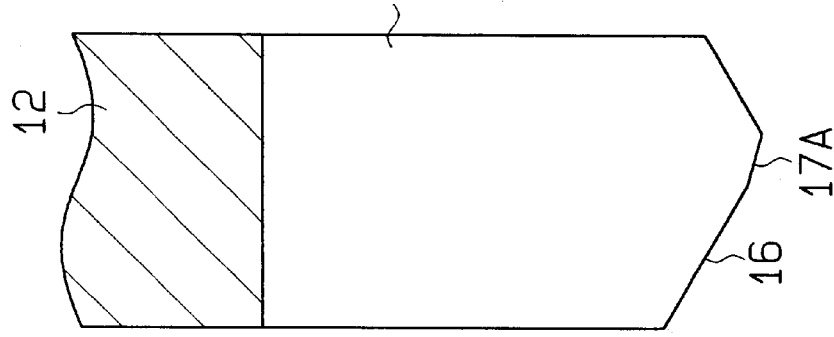
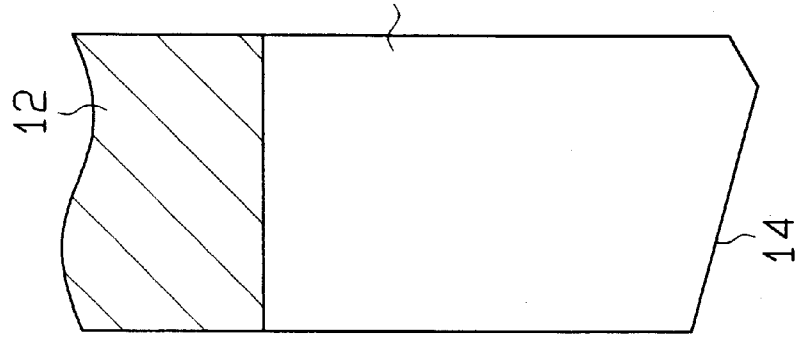

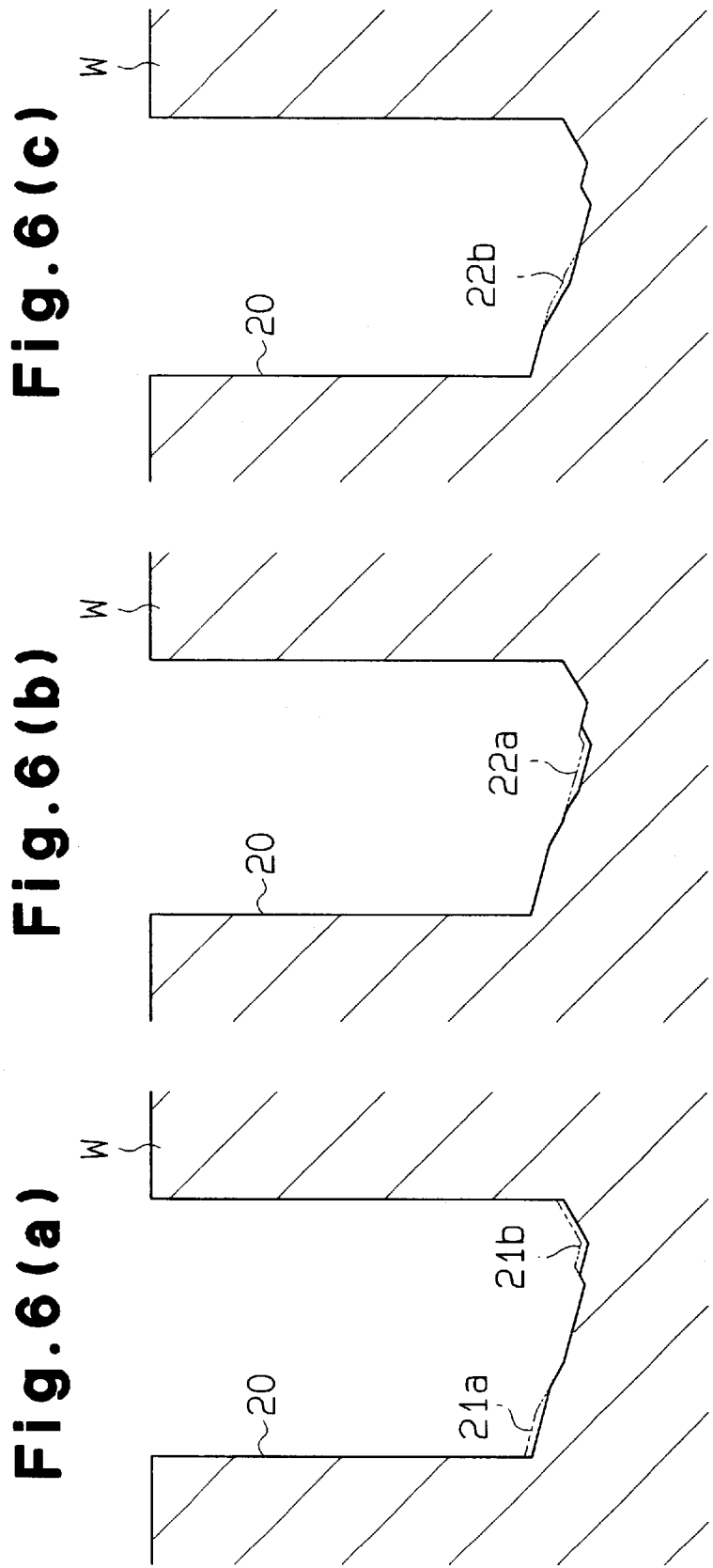

Prior Art Fig.7(a)
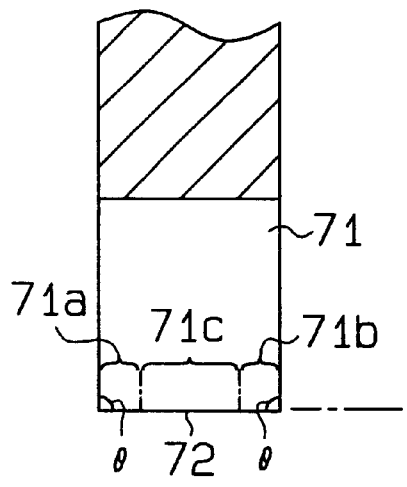
Prior Art Fig.7(b)
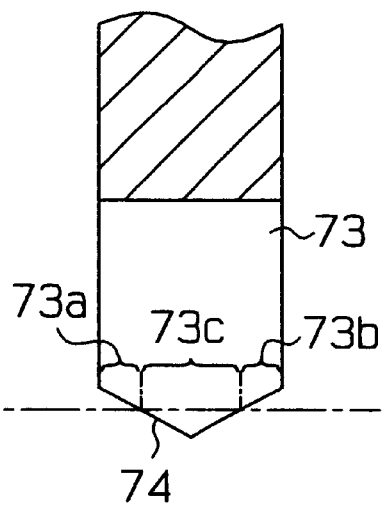
Prior Art Fig.8(a)
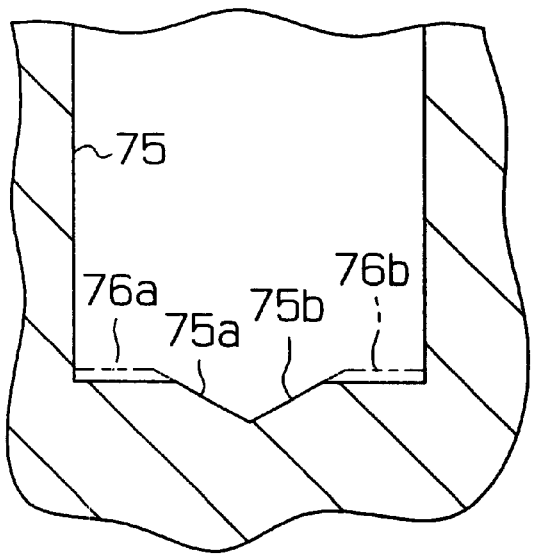
Prior Art Fig.8(b)
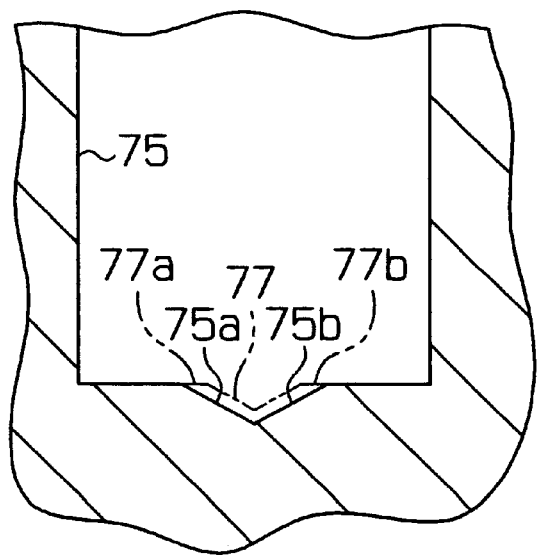

HOLE CUTTER

BACKGROUND OF THE INVENTION

1. Field of the Invention

The present invention relates to hole cutters, and more particularly, to cutters mounted on machine tools to form holes.

2. Description of the Related Art

Hole cutters are mounted on machine tools to form holes in workpieces. Japanese Unexamined Patent Publication No. 1-199710 describes such a hole cutter. As shown in FIG. 7(a), the cutter has a cylindical body with a plurality of flat first cutting teeth 71 provided on the peripheral section of its base end. The cutting teeth 71 are arranged having a predetermined interval between one another. A first blade edge 72 is provided at the distal end of each first tooth 71. The blade edge 72 extends along a direction perpendicular to the axis of the body. The angles θ between the blade edge 72 and the left and right sides of the tooth 71 are approximately 90 degrees. Left, right, and middle sections 71a, 71b, and 71c are defined on each tooth 71.

A triangular second cutting tooth 73 is arranged between each pair of adjacent first teeth 71 on the end face of the body. As shown in FIG. 7(b), a second blade edge 74 is provided at the distal end of each second tooth 73. The center of each blade edge 74 projects downward. Thus, the left and right sides of the blade edge 74 extend obliquely toward the center. Left, right, and middle sections 73a, 73b, 73c are defined on each tooth 73. The tooth depth, that is, the depth of the workpiece that may be cut by the tooth, at the left and right sections 73a, 73b of each second tooth 73 is smaller than that of the left and right sections 71a, 71b of each first tooth 71. The tooth depth of the middle section 73c of each second tooth 73 is greater than that of the middle section 71c of each first tooth 71.

To use the hole cutter of the above structure, the blade edges 72, 74 of the associated teeth 71, 73 are abutted against the surface of a workpiece. In this state, the body of the cutter is rotated about its axis at a predetermined circumferential speed and moved toward the workpiece at a predetermined feed rate. This causes the blade edges 72, 74 of the respective teeth 71, 73 to machine the workpiece. Machining of the workpiece causes a groove 75 to be formed in the workpiece, as shown in FIG. 8(a). The left and right portions at the bottom of the groove 75 are machined horizontally by the first teeth 71. The middle portion of the groove 75 is machined into a substantially V-shaped valley that consists of inclined surfaces 75a, 75b.

As shown by the broken line in FIG. 8(a), the first teeth 71 remove flattened strip-like cutting chips 76a, 76b from the bottom left and right portions of the groove 75. As shown by the broken line in FIG. 8(b), the second teeth 73 remove cutting chips 77 having a V-shaped cross-section from the bottom middle portion of the groove 75. Accordingly, rotation of the body results in the first and second teeth 71, 73 machining three separate portions (left, right, and middle) in the bottom of the groove 75. This narrows the width of each cutting chip 76a, 76b, 77 and facilitates the discharging of the chips 76a, 76b, 77. Such width is shown, between sides 77a and 77b of the chip 77 in FIG. 8(a).

When using the above hole cutter, the triangular second teeth 73 remove V-shaped cutting chips 77 from the bottom middle portion of the groove 75. The left and right sides 77a and 77b the chips 77 are each pressed against the bottom of the groove 75 in directions perpendicular to the inclined surfaces 75a, 75b. This causes the right and left sides 77a and 77b respectively of the chips 77 to bend toward each other and entangles the chips 77. As a result, it is difficult to discharge the chips 77 out of the groove 75.

In addition, when the amount of entangled chips 77 becomes large, it becomes further difficult to discharge the chips 77 out of the groove 75.

Furthermore, when machining the left and right portions of the groove 75 with the first teeth 71, frictional force is produced between each first blade edge 72 and the left wall, the right wall, and the bottom of the groove 75. This results in the left and right sections 71a, 71b of each first blade edge 72 being subject to damage.

SUMMARY OF THE INVENTION

Accordingly, it is a primary objective of the present invention to provide a hole cutter capable of discharging cutting chips that are produced by the second teeth.

Another objective of the present invention is to provide a hole cutter that narrows the width of the cutting chips produced by the second teeth.

A further objective of the present invention is to provide a hole cutter that prevents the blade edges of the first teeth from being damaged.

To achieve the above objectives, an improved hole cutter is provided. The hole cutter has a cylindrical wall and an end for forming a hole in a workpiece. The hole cutter includes a plurality of first cutting teeth peripherally arranged on the end of the cutter. The adjacent first cutting teeth are separated by a predetermined interval from one another and each of the first cutting teeth includes a first vertex. The hole cutter further includes a plurality of second cutting teeth each provided between the adjacent first cutting teeth. Each of the second cutting teeth includes a second vertex. A flattening section is provided with the second cutting tooth adjacent to the second vertex.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 3(a) is a cross-sectional view taken along line 3(a)—3(a) in FIG. 2 showing the front side of a first cutting tooth;

FIG. 3(b) is a cross-sectional view taken along line 3(b)—3(b) in FIG. 2 showing the front side of a second cutting tooth;

FIG. 3(c) is a diagrammatic cross-sectional view showing the first and second cutting teeth in an overlapped state;

FIG. 5(a) is a cross-sectional view showing the front side of a first tooth according to a second embodiment of the present invention;

FIGS. 5(b) and (c) are cross-sectional views showing the front side of a second tooth;

FIG. 5(d) is a diagrammatic cross-sectional view showing the first and second cutting teeth in an overlapped state;

FIGS. 6(a), (b), and (c) are cross-sectional views showing a groove;

FIG. 7(a) is a cross-sectional view showing the front side of a first tooth in the prior art;

FIG. 7(b) is a cross-sectional view showing the front side of a second tooth in the prior art; and FIGS. 8(a) and (b) are cross-sectional views showing a groove in the prior art.

DETAILED DESCRIPTION OF THE PREFERRED EMBODIMENTS

A first embodiment of the present invention will hereafter be described with reference to FIGS. 1 to 4.

Figure 1:
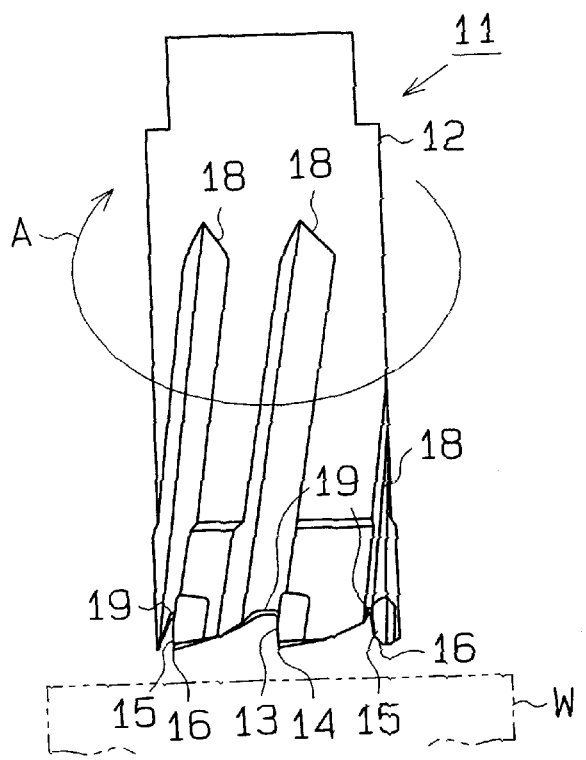
FIG. 1 is a front view showing a hole cutter according to a first embodiment of the present invention.
Figure 2:
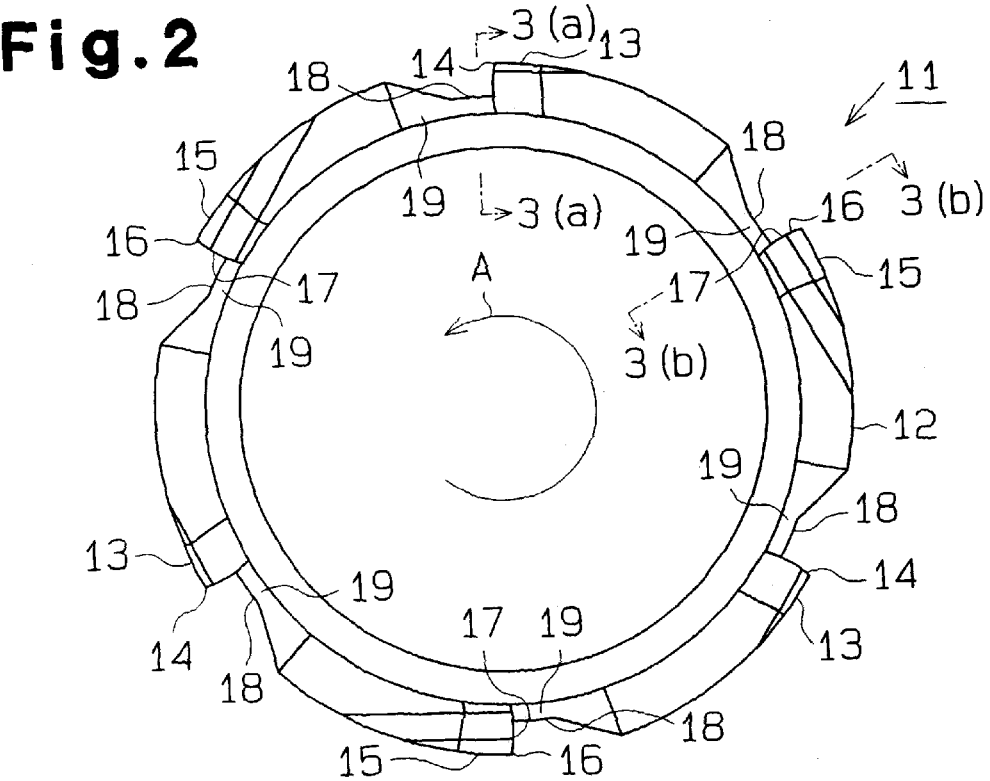
FIG. 2 is an enlarged bottom view showing the hole cutter.

As shown in FIG. 1, a hole cutter 11 has a body 12 that is attached to a machine tool (not shown) and rotated about its axis in the direction indicated by arrow A. As shown in FIG. 2, a plurality of carbide tips, or first cutting teeth 13, are brazed to the peripheral portion of the body 12. The first teeth 13 are arranged having a predetermined interval between one another. Left, right, and middle sections 13a, 13b, 13c are defined on each tooth 13.

As shown in FIG. 3(a), a first blade edge 14 extends laterally at the distal end of each first tooth 13. The blade edge 14 projects downward so as to form a triangular shape. The vertex P1 of the blade edge 14 is located at the peripheral side (right side in FIG. 3(a)) of the body 12. The left and right sides of the vertex P1 extend obliquely upward therefrom. Accordingly, the angles θ obtained between the blade edge 14 at the left section 13a of the first tooth 13 and the left wall of the same tooth 13, and between the blade edge 14 at a right section 13b of the first teeth 13 and the right wall of the same tooth 13 are obtuse.

As shown in FIG. 2, a plurality of carbide tips, or second cutting teeth 15, are brazed to the peripheral portion of the body 12 between each pair of adjacent first teeth 13. As shown in FIG. 3(b), a second blade edge 16 extends laterally at the distal end of each second tooth 15. The blade edge 16 projects downward so as to form a triangular shape. The vertex P2 of the blade edge 16 is located at a position slightly away from the center of the edge 16 toward the peripheral side of the body 12 (right side in FIG. 3(b)). The left and right sides of the vertex P2 extend obliquely upward as they approach the associated left and right sides of the second tooth 15. Left, right, and middle sections are defined on each tooth 15.

The second blade edge 16 has a linear flattening section 17 that is located at the inner side (left side in FIG. 3(b)) of the vertex P2. With respect to a horizontal plane, the inclination of the flattening section 17 is less than the inclination of the section located at the inner side (left side in FIG. 3(b)) of the flattening section 17.

As shown in FIG. 3(c), the tooth depth, that is, the depth of the workpiece which may be cut by the tooth, of the left and right sections 15a, 15b of each second tooth 15 is smaller than that of the left and right sections 13a, 13b of each first tooth 13. The tooth depth of the middle section 15c of each second tooth 15 is greater than that of the middle section 13c of each first tooth 13. The flattening section 17 of each second blade edge 16 is included in an area corresponding to the middle section 15c of each second tooth 15. The flattening section 17 is also parallel to the blade edge 14 at the middle section 13c of each first tooth 13.

As shown in FIG. 1, a plurality of cutting chip discharge passages 18 are provided along the peripheral surface of the body 12. Each discharge passage 18 extends toward the distal end of the body 12 obliquely with respect to the direction indicated by arrow A. The bottom of each discharge passage 18 is located between each pair of adjacent teeth 13, 15. The passage 18 extends continuously to an inclined guide surface 19 provided between the pair of adjacent teeth 13, 15. The guide surface 19 is inclined upward from its inner side to its outer side.

Figure 4A:
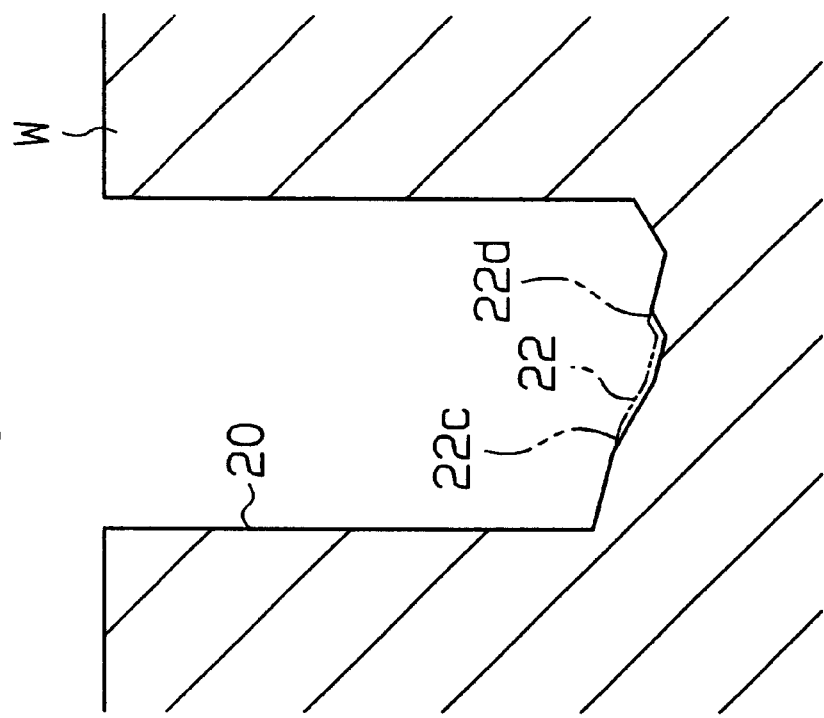
FIGS. 4(a) and (b) are cross-sectional drawings showing a groove.

To machine a through hole in a workpiece W (illustrated by the broken line in FIG. 1), the hole cutter 11 is first rotated about its axis. The hole cutter 11 is then moved along its axis at a predetermined feed rate toward the workpiece W. As the first and second blade edges 14, 16 of the associated first and second teeth 13, 15 come into contact with the workpiece W, the blade edges 14, 16 machine the workpiece W. As shown in FIG. 4(a), the continuation of the machining forms a groove 20 in the workpiece W along the orbit of the blade edges 14, 16.

The shape of the left and right portions at the bottom of the groove 20 coincides with the shape of the left and right sections of the first blade edges 14. The shape of the middle portion of the bottom of the groove 20 coincides with the shape of the middle section of the second blade edges 16. The portion in the bottom of the groove 20 that corresponds to the flattening section 17 of the second blade edges 16 is flattened. Each first tooth 13 removes cutting chips 21a, 21b as shown by the broken lines in FIG. 4(a) from the left and right portions of the groove 20. This produces frictional force between the first blade 14 of each first tooth 13 at its left and right sections and the bottom and side walls of the groove 20.

Figure 4B:
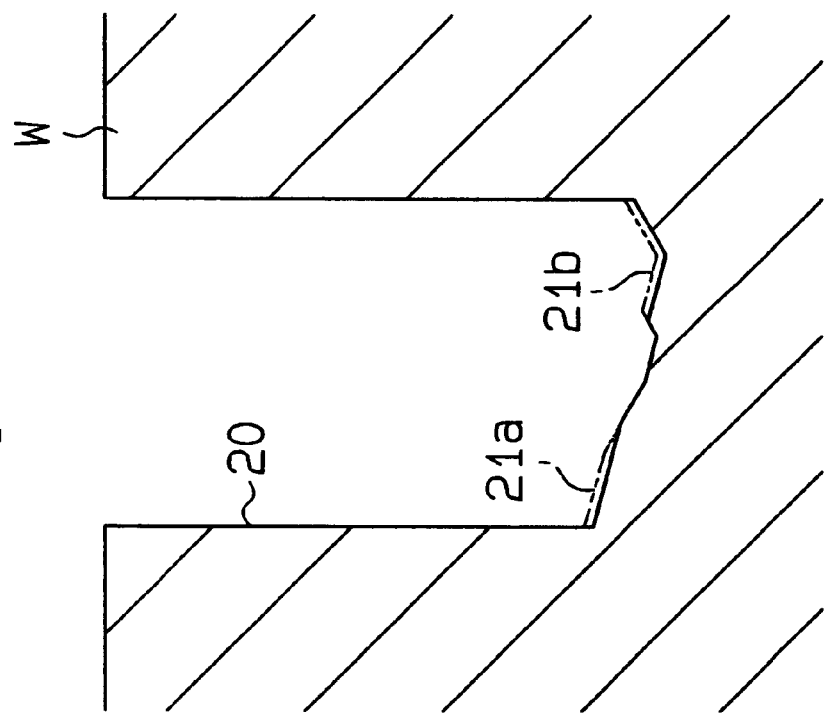

The adjacent second teeth 15 then remove cutting chips 22 as shown by the broken line in FIG. 4(b) from the middle portion of the groove 20. The second blade edge 16 that removes the cutting chip 22 from the bottom of the groove 20 is provided with the flattening section 17. Thus, the sides 22c and 22d of the strip-like chip 22 are located at positions further from each other than compared with the spacing of the sides 77a and 77b of the cutting chips 77 removed from the same portion in the prior art. This prevents the sides 22c and 22d of the chip 22 from being bent toward each other when the bottom surface of each tooth 15 presses the chip 22 against the bottom surface of the groove 20 in a direction perpendicular to the surface of the groove 20. As a result, the chips 22 do not become entangled with one another.

By employing the first and second teeth 13, 15, the bottom surface of the groove 20 is machined separately at the three sections (left, right, and middle). The cutting chips 21a, 21b, 22 removed from the bottom surface of the groove 20 are discharged therefrom through the discharge passage 18. The hole cutter 11 continues formation of the groove 11 until the cutter 11 pierces the workpiece W and forms a through hole.

The advantageous effects obtained through the first embodiment will now be described.

Each second blade edge 16 is provided with the linear flattening section 17 at its middle section. This enables the cutting chip 22 removed from the bottom surface of the groove 20 to be formed in a strip-like shape as shown by the broken line in FIG. 4(b). The sides 22c and 22d of each cutting chip 22 differ from the sides of the chips in the prior art (e.g., sides 77a and 77b of the chip 77) in that they are separated from each other more than the sides 77a and 77b of the prior art chip 77. This prevents the sides 22c and 22d of the chip 22 from being bent toward each other when the sides 22c and 22d of the chip 22 are pressed against the bottom surface of the groove 20. Accordingly, the chips 22 do not become entangled with one another and are easily discharge out of the groove 20.

The angles θ defined between the left section 13a of the blade edge 14 and the left wall of the first teeth 13, and between the right section 13b of the blade edge 14 and the right wall of the first teeth 13 are obtuse. This increases the strength of the first teeth 13 at their left and right sections 13a, 13b in comparison with the prior art. Accordingly, this prevents the first blade edges 14 from being damaged due to the frictional force produced between the blade edges 14 and the walls of the groove 20.

The cutting chips 21a, 21b, 22 removed from the bottom of the groove 20 by the first and second teeth 13, 15 are discharged from the groove 20 through the discharge passages 18 provided in the peripheral surface of the body 12. This ensures the discharge of the cutting chips 21a, 21b, 22.

A second embodiment of the present invention will hereafter be described with reference to FIGS. 5 and 6. Parts that are identical to those employed in the first embodiment will be denoted with the same numerals and will not be described.

As shown in FIG. 5(a), the first teeth 13 employed in this embodiment are identical to the teeth 13 employed in the first embodiment. A pair of second cutting teeth 15A, 15B, which are shown in FIGS. 5(b) and (c), are provided between each pair of adjacent first teeth 13. As shown in FIG. 5(d), flattening sections 17A, 17B are provided in each second tooth 15A, 15B, respectively. In each of the two second teeth 15A, 15B, the sections where the tooth depth is greater than that of the first teeth 13 are offset from each other in the direction along which the flattening sections 17A, 17B extend. Hence, the flattening sections 17A, 17B are offset from each other along their extending directions.

Accordingly, when a through hole is formed in the workpiece W by the hole cutter 11 of this embodiment, the second teeth 15A, 15B machine the middle portion of the groove 20 at two separate locations. The second teeth 15A, 15B are shaped so that they machine the bottom of the groove 20 into the same shape as the groove 20 machined by the second teeth 15 in the first embodiment.

A through hole is machined in the workpiece W in the same manner as the first embodiment. The hole cutter 11 first forms the groove 20 as shown in FIG. 6(a). Each first tooth 13 removes cutting chips 21a, 21b as shown by the broken lines in FIG. 6(a) from the bottom left and right portions of the groove 20. The subsequent second tooth 15A then removes a cutting chip 22a as shown by the broken line in FIG. 6(b) from the peripheral side (right side of FIG. 6(b)) in the middle portion of the groove 20. Afterward, the following second tooth 15B removes a cutting chip 22b as shown by the broken line in FIG. 6(c) from the inner side (left side of FIG. 6(c)) of the middle portion of the groove 20.

The advantageous effects obtained through the second embodiment will now be described.

The middle portion at the bottom of the groove 20 is divided into two parts and machined separately by the two sets of second teeth 15A, 15B, whereas the whole middle section is machined by a single set of teeth 15 in the first embodiment. This enables the cutting chips 22a, 22b produced in the second embodiment to be smaller than the cutting chips 22 produced in the first embodiment. Accordingly, the cutting chips 22a, 22b are discharged out of the groove 20 in a more simple manner than compared with the first embodiment.

The present invention may be modified in the following manner.

In the second embodiment, two second teeth 15A, 15B are provided between each pair of adjacent first teeth 13 and divide the machining of the middle portion of the groove 20 into two parts. However, the present invention is not limited to two sets of second teeth and may be provided with more sets of second teeth. For example, three second teeth may be provided between each pair of adjacent first teeth 13 with each tooth of the set of second teeth machining a different part of the middle portion of the groove 20. This further reduces the size of the cutting chips removed from the bottom of the groove 20 in comparison with the second embodiment.

In each of the above embodiments, the angles θ defined between the left section 13a of the blade edge 14 and the left wall of the first teeth 13, and between the right section 13b of the blade edge 14 and the right wall of the first teeth 13 are obtuse. However, the angles θ are not required to be obtuse and may be acute or right.

In each of the above embodiments, the discharge passages 18 may be eliminated from the structure of the hole cutter 11.

In each of the above embodiments, the first teeth 13 and the second teeth 15, 15A, 15B each have a triangular shape. However, either one of the first teeth 13 or the second teeth 15, 15A, 15B may be formed having a flat shape.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such or other embodiments, and with various modifications required by the particular applications or uses of the present invention. It is intended that the appended claims be construed to include alternative embodiments to the extent permitted by the prior art.

What is claimed is:

1. A hole cutter having a cylindrical wall and an end for forming a hole in a workpiece, said cutter comprising:

a plurality of first cutting teeth peripherally arranged on the end of the cutter, adjacent ones of said cutting teeth being separated by a predetermined interval from one another;

each of said first cutting teeth including a first vertex;

a plurality of second cutting teeth, each provided between said adjacent first cutting teeth;

each of said second cutting teeth including a second vertex;

a flattening section providing with each said second cutting tooth adjacent to said second vertex; and a plurality of third cutting teeth, each of said third cutting teeth being located next to one of said second cutting teeth and between adjacent ones of said first cutting teeth.

2. The hole cutter a set forth in claim 1 further comprising:

each said first cutting tooth including a pair of first side sections and a first middle section separating said first side sections;

one of said first side sections having said first vertex;

each said second cutting tooth including a pair of second side sections and a second middle section separating said second side sections;

said second middle section having a tooth depth greater than that of the first middle section; and said second middle section having said second vertex.

3. The hole cutter as set forth in claim 2, wherein each of said first side sections has a tooth depth greater than that of each of said second side sections.

4. The hole cutter as set forth in claim 2, wherein at least one of said first side sections intersects said cylindrical wall at an obtuse angle.

5. The hole cutter as set forth in claim 4 further comprising a plurality of grooves extending upward on said cylindrical wall from said end surface, each of said grooves being formed between adjacent ones of said teeth.

6. A hole cutter having a cylindrical wall and a ring-shaped end surface, said end surface having a first cutting edge and a second cutting edge alternating along a periphery of said end surface, wherein said cutter rotates to form a hole in a workpiece and removes cutting chips, said cutter comprising:

said first cutting edge having a pair of first side sections and a first middle section that separates said first side sections, wherein said first middle section projects downward from at least one of said first side sections;

said second cutting edge having a pair of second side sections and a second middle section that separates said second side sections, wherein said second middle section projects downward from said second side sections;

said second cutting edge having means for cutting the workpiece with the cutting chips being removed therefrom in a strip-like shape; and a plurality of third cutting teeth, each of said third cutting teeth being located next to one of said second cutting teeth and between adjacent ones of said first cutting teeth.

7. The hole cutter as set forth in claim 6, wherein said first cutting edge has a first vertex and wherein said second middle section has a second vertex.

8. The hole cutter as set forth in claim 7, wherein said means includes a linear flattening portion located next to said second vertex.

9. The hole cutter as set forth in claim 8, wherein each of said first side sections and said second side sections has a tooth depth, wherein the tooth depth of each of said first side sections is greater than the tooth depth of each of said second side sections.

10. The hole cutter as set forth in claim 9, wherein said first side section intersects said cylindrical wall at an obtuse angle.

11. The hole cutter as set forth in claim 10 further comprising a plurality of grooves extending upward on said cylindrical wall from said end surface, each of said grooves being formed between adjacent ones of said cutting edges.

12. A hole cutter having a cylindrical wall and an end for forming a hole in a workpiece, said cutter comprising:

a plurality of first cutting teeth peripherally arranged on the end of the cutter, adjacent ones of said cutting teeth being separated from one another;

a plurality of second cutting teeth, each provided between said adjacent first cutting teeth; and a plurality of third cutting teeth, each of said third cutting teeth being located next to one of said second cutting teeth and between adjacent ones of said first cutting teeth.

* * * * *